United States Patent Office 2,920,071
Patented Jan. 5, 1960

2,920,071
NEW METAL COMPLEX DYESTUFFS

Hans Ruprecht Hensel, Heidelberg, Bernd Eistert, Saarbruecken, and Hans Baumann and Johannes Dehnert, Ludwigshafen (Rhine), Germany, assignors to Badische Anilin- & Soda-Fabrik Aktiengesellschaft, Ludwigshafen (Rhine), Germany No Drawing. Application April 22, 1958
Serial No. 730,062

Claims priority, application Germany April 30, 1957

14 Claims. (Cl. 260—148)

This invention relates to new metal compounds and especially it relates to new metallized dyestuffs of great value in the field of the dyeing of textiles, of lacquers, plastics and so on.

We have found that new metal complex dyestuffs are obtained by condensing an arylazo-malonodialdehyde with at least one primary aromatic amino compound which contains a hydroxyl or thiol group in ortho-position to the amino group and reacting the resultant di-anils of the tautomeric formulae

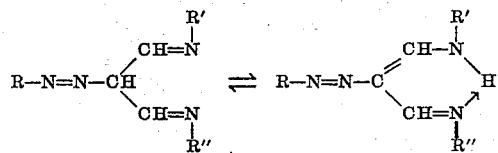

wherein R represents an aromatic radical and R' and R" aromatic radicals which are identical with or different from each other and which contain a hydroxyl or thiol group in ortho-position to the nitrogen atom with a metal-supplying compound of a complex-forming metal.

For the sake of simplicity, only the right-hand of the above two tautomeric formulae will be used hereinafter.

The arylazo-malonodialdehydes used as initial materials for the new process have the general formula:

in which R is an aromatic radical. They can readily be obtained for example by coupling any diazonium salts with beta-aminoacroleins twice substituted on the nitrogen atom. Like the aromatic ortho-aminohydroxyl or ortho-aminothiol compounds, they may also contain substantially neutral substituents, such as halogen atoms, sulfonic acid, carboxylic acid, sulfonic acid or carboxylic acid amido, alkyl sulfone, aryl sulfone, aryl azo, alkoxy, nitro or acylamino groups; these groups may be further substituted, for example the sulfonic and carboxylic acid amido groups by hydrocarbon substituents on their N atoms and the arylazo groups by sulfonic acid or sulfonic acid amido groups. It is not necessary for the substituents contained in the radicals R' and R" in the above formula to be identical with each other.

As compounds of complex-forming metals there may be used for example salts, such as acetates, formiates, halides, sulfates or nitrates of the so-called transition metals of the atomic numbers 24 to 30, for example of copper, nickel, cobalt, iron, zinc or chromium; the complexes of these metals for example with salicylic acid or with other compounds capable of forming chelates may however also be used as metal-supplying compounds.

The reaction of the arylazo-malonodialdehydes with the aromatic ortho-aminohydroxyl or ortho-aminothiol compounds may be carried out for example by dissolving the two said reactants in water or in organic solvents, as for example alcohols, acetone, glacial acetic acid, formamide, dimethyl-formamide, diglycol or pyridine, in about the mol ratio 1:2 of the reactants, and allowing them to react in the solution at a temperature of about 20° to 100° C., preferably at 50° to 80° C., for a period of 20 to 30 minutes. It is not necessary that the amount of the solvent is sufficient to dissolve the reactants completely, but a smaller amount of the solvent dissolving the reactants partly will do. It is possible however to react 1 mol of the arylazo-malonodialdehyde simultaneously or consecutively with 1 mol each of ortho-aminohydroxyl and/or ortho-aminothiol compounds which are different from each other, thus arriving at di-anils of the above formula in which R' and R" are different from each other. Then at least 1 mol of a compound of a complex-forming metal is added, whereupon, depending on the nature of the solvent and of the substituents in the aromatic radicals of the dyestuff, the latter is precipitated in crystalline form either while still hot or after allowing to cool, or is separated by the subsequent addition of a precipitant, such as water, acetone, alcohol or sodium chloride solution. A variant of the process characterized by special simplicity comprises allowing all the reaction components—arylazo-malonodialdehyde, aromatic ortho-aminohydroxyl and/or ortho-aminothiol compounds and a compound of a complex-forming metal—to react on one another, either at ordinary or elevated temperature, a period of from one quarter of an hour to six hours, but usually between one half hour and four hours, being necessary for complete reaction.

The nature of the substituents in the aromatic radicals of the reactants influences the shade of color, the solubility and the fastness properties of the complex dyestuffs. For example especially deep shades of color are obtained when using for the new process arylazomalonodialdehydes prepared by coupling 4-aminoazobenzene and similar compounds with a beta-dialkylamino-acrolein.

The new dyestuffs are suitable for dyeing and coloring lacquers, plastics and natural and synthetic fibers, especially wool, silk and synthetic polyamide fibers, as for example polycaprolactam and polyhexamethylenediamine adipate, on which they give dyeings of good to excellent fastness to light and good to very good wet fastness properties.

The following examples will further illustrate this invention but the invention is not restricted to these examples but in particular extends to many more dyestuffs. The parts specified in the examples are parts by weight.

Example 1

8.8 parts of phenylazo-malonodialdehyde and 19 parts of 1-hydroxy-2-aminobenzene-4-sulfonic acid amide are heated in 200 parts of dimethylformamide for 30 minutes at 70° to 80° C. Then a solution of 12.5 parts of crystallized nickel acetate in 50 parts of water is added to the mixture and the yellow color of the solution changes to red. By cooling, the dyestuff is precipitated in brown-red crystals which after drying have a greenish shimmer. The yield amounts to 26 parts. Analysis corresponds to the formula of the nickel complex of the di-anil of the formula

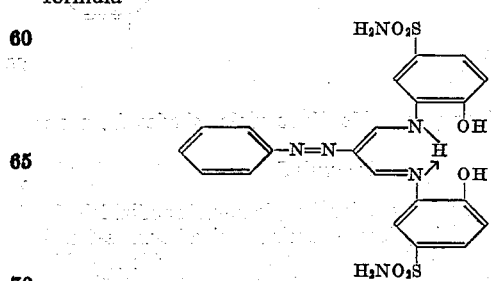

The dyestuff dyes wool and polyamide fibers orange-yellow shades from an acid bath.

Example 2

4.9 parts of 2.5-dichlorphenylazo-malonodialdehyde and 10.5 parts of 1-hydroxy-2-aminobenzene-4-sulfonic acid phenylamide are heated in 200 parts of dimethylformamide for 20 minutes at 60° to 70° C. Then a solution of 5 parts of crystallized copper sulfate in 50 parts of water is added to the reaction mixture and the dyestuff is precipitated from the brown-red solution by the addition of 100 parts of water. It is obtained in a yield of 14 parts, constitutes the copper complex of the di-anil of the formula

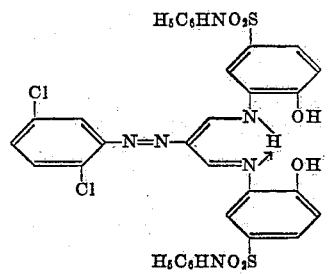

and dyes wool and polyamide fibers orange to brown shades from an acid bath.

Instead of using the above-mentioned azo-malonodialdehyde compound of 2.5-dichlorobenzene, the reaction may also be carried out for example with those of alpha- or beta-naphthylamine, of 1-aminonaphthalene-4-sulfonic acid or of 2-aminonaphthalene-6-sulfonic acid dimethylamide.

Example 3

11 parts of a dyestuff which dyes wool and polyamide fibers Bordeaux red to violet shades from a neutral or weak acid bath are obtained from 4.4 parts of 4-nitrophenylazo-malonodialdehyde, 9.1 parts of 1-hydroxy-2-aminobenzene-4-sulfonic acid dimethylamide in 200 parts of dimethylformamide and a solution of 5 parts of crystallized copper sulfate in 50 parts of water by the technique described in Example 1.

Example 4

From 6.8 parts of benzene-4-sulfonic acid-1(azo)4-benzene-1(azo)2-malonodialdehyde, 5.7 parts of 1-hydroxyl-2-amino-4-chlorbenzene there are obtained as in Example 1 by using a solution of 5 parts of crystallized copper sulfate in 50 parts of water, 12 parts of the copper complex of the di-anil of the formula

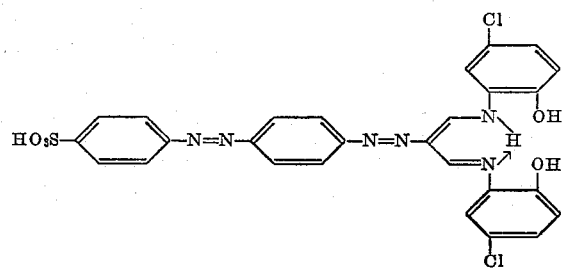

It dyes wool or polyamide fibers violet shades from an acid bath.

Example 5

4.2 parts of para-chlorphenylazo-malonodialdehyde and 14 parts of 1-hydroxy-2-amino-4-nitrobenzene-6-sulfonic acid are heated in 150 parts of dimethylformamide for 30 minutes at 80° C. and then a solution of 5 parts of crystallized copper sulfate in 50 parts of water is added to the mixture. 18 parts of the copper complex of the di-anil of the formula

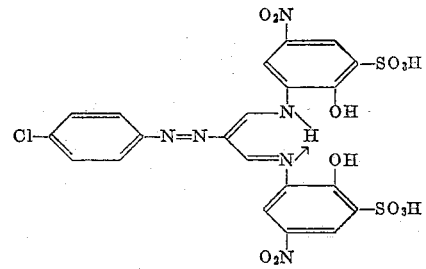

are obtained. It dyes wool and polyamide fibers orange shades from a neutral to acid bath.

Example 6

From 4.4 parts of 4-nitrophenylazo-malonodialdehyde and 13.6 parts of 1-amino-2-hydroxynaphthalene-4-sulfonic acid in 200 parts of dimethylformamide there are obtained, after the addition of a solution of 5 parts of nickel acetate in 20 parts of water, 11 parts of the nickel complex of the di-anil of the formula

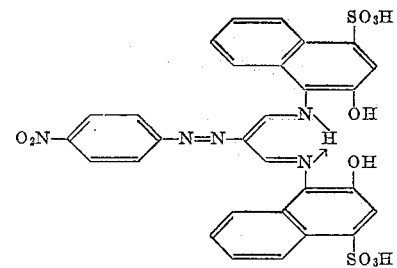

It dyes wool and polyamide fibers brown-red shades from a neutral to acid bath.

Example 7

From 5.1 parts of benzene-1-azomalonodialdehyde-4-sulfonic acid amide and 5 parts of 2-aminothiophenol in 150 parts of dimethylformamide there are obtained, after the addition of a solution of 5 parts of copper sulfate in 30 parts of water, 12 parts of a dyestuff consisting of the copper complex of the di-anil of the formula

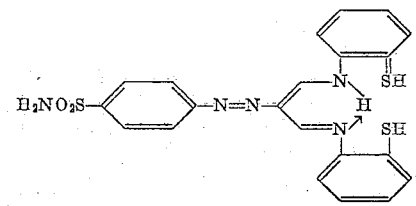

which dyes wool and polyamide fibers brown shades from an acid bath.

From 1 mol of the arylazo-malonodialdehyde component specified in paragraph 1 of this example and 2 mols of 1-hydroxy-2-amino-4-nitrobenzene, there may be obtained as described in the said paragraph 1 the copper complex of the di-anil of the formula

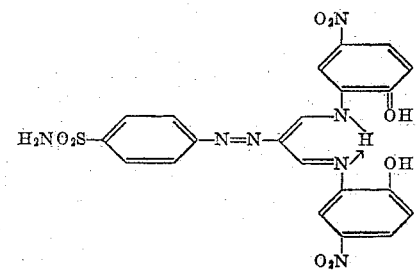

Similarly 2 mols of 1-hydroxy-2-amino-5-nitrobenzene or 1 mol each of 1-hydroxy-2-amino-4- and -5-nitrobenzene may be used.

Example 8

9 parts of 4-nitrophenylazo-malonodialdehyde and 16 parts of 1-amino-2-hydroxybenzene-5-sulfonic acid are dissolved in 300 parts of water with the addition of 40 parts of 10% caustic soda solution and 12 parts of crystallized chromium (III) chloride added. After neutralization of the resultant mixture with acetic acid and heating at 90° to 100° C. for 3 to 4 hours, there are obtained 20 parts of a red dyestuff which constitutes the chromium complex of the di-anil of the formula

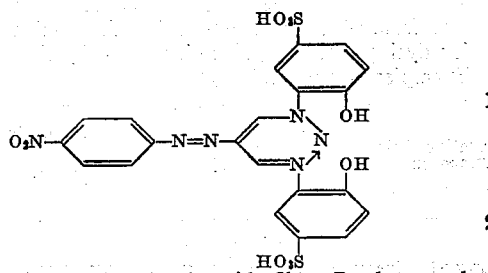

and which dyes wool and polyamide fibers Bordeaux red shades from a neutral to acid bath.

Example 9

From a mixture of 11 parts of benzene-1(azo)4-benzene-1(azo)2-malonodialdehyde, 15.5 parts of 1-amino-2-hydroxy-benzene-5-sulfonic acid amide and 200 parts of dimethylformamide there is obtained, by adding 11 parts of crystallized chromium (III) chloride and heating for 1 hour at 120° to 130° C., a violet dyestuff which consists of the chromium complex of the di-anil of the formula

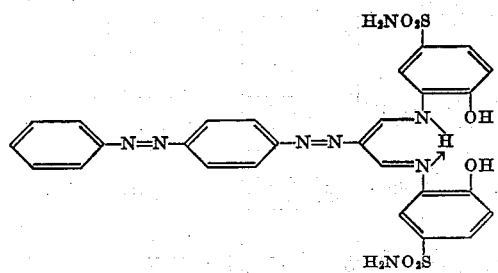

in an amount of 20 parts. It dyes wool and polyamide fibers violet shades from a neutral to acid bath.

Example 10

A mixture of 9 parts of 4-nitrophenylazo-malonodialdehyde, 15.5 parts of 1-amino-2-hydroxybenzene-5-sulfonic acid amide, 10 parts of cobalt (II) acetate and 250 parts of dimethylformamide is heated for 4 hours at 120° to 130° C. and there are thus obtained 22 parts of the cobalt complex of the di-anil of the formula

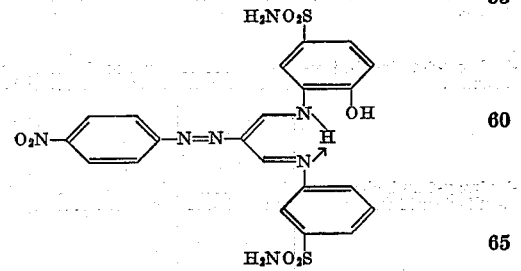

It dyes wool and polyamide fibers Bordeaux red shades from a neutral to acid bath.

Example 11

A mixture of 5.1 parts of benzene-1-sulfonic acid amide-4(azo)2-malonodialdehyde, 7.6 parts of 1-amino-2-hydroxybenzene-5-sulfonic acid amide, 3.6 parts of zinc acetate and 150 parts of dimethylformamide is heated for 1 hour at 120° to 130° C. After dilution with water there are obtained 10 parts of the zinc complex of the di-anil of the formula

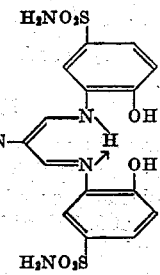

It dyes wool and polyamide fibers orange shades from a neutral bath.

Example 12

From a mixture of 4.4 parts of 4-nitrophenylazomalonodialdehyde, 6.8 parts of 1-amino-2-hydroxy-4-nitrobenzene, 3.6 parts of zinc acetate and 200 parts of dimethylformamide there are obtained after heating for an hour 9 parts of the zinc complex of the di-anil of the formula

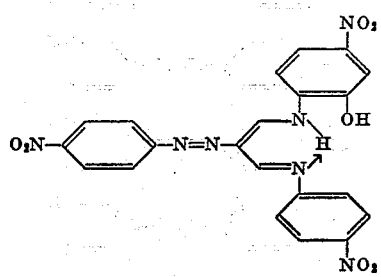

It dyes wool Bordeaux red shades and polyamide fibers blue shades from a neutral to weak acid bath.

Example 13

10 parts of 2.5-dichlorphenylazo-malonodialdehyde, 8 parts of 1-hydroxy-2-aminobenzene-4-sulfonic acid amide and 10 parts of 1-hydroxy-2-aminobenzene-4-sulfonic acid anilide are dissolved in 250 parts of dimethylformamide while heating to 50° to 70° C. Then a solution of 10 parts of crystallized copper sulfate in 100 parts of water is added and the complex dyestuff, after the reaction mixture has been stirred for another hour at 50° to 70° C., precipitated by the addition of 300 parts of water. The yield amounts to 25 parts of the copper complex of the di-anil of the formula

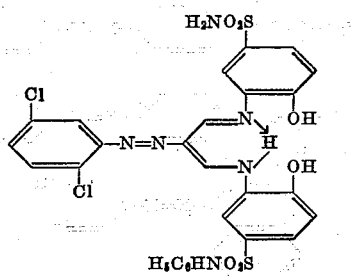

It dyes wool and polyamide fibers orange shades.

Example 14

100 parts of woolen fabric are introduced at 50° C. into a dyebath which contains, in 4000 parts of water, 1 part of the dyestuff of Example 2, 1 part of the reaction product obtained from 1 mol of sperm oil alcohol by adding on 80 mols of ethylene oxide and by sulfonation of the addition product, 3 parts of ammonium acetate and 3 parts of 30% acetic acid. The bath is heated during the course of 20 minutes to 98° to 100° C. and dyeing continued for 50 minutes at this temperature. An orange dyeing of good uniformity, excellent fastness to light and very good wet fastness properties is thus obtained.

*Example 15*

100 parts of a woven or knitted fabric of a polyamide, as for example polyhexamethylenediamine adipate or polycaprolactam, or of a polyurethane, are introduced into a bath at 50° C. of 2 parts of the dyestuff of Example 7, paragraph 2, 5 to 10 parts of 25% aqueous ammonia solution, and 5 to 10 parts of the reaction product obtained from 1 mol of sperm oil alcohol by adding on 80 mols of ethylene oxide and by sulfonation of the addition product, in 5000 parts of water. The bath is heated during the course of 30 minutes to 100° C., then 10 parts of ammonium sulfate are introduced, and the said temperature is maintained for about 30 to 60 minutes. A red-brown dyeing of excellent fastness to light and very good wet fastness properties is obtained.

The following table gives components suitable for the production of further dyestuffs of the said kind by the methods of Examples 1 to 13; the complexes obtainable therefrom with compounds of the said metals may be used for dyeing wool or polyamide fibers by the methods of Examples 13 and 14.

| arylazomalonodialdehyde component (1 mol) | aromatic orthohydroxyl component (2 mols) | metal | Shade of color on— wool | Shade of color on— polyamide fibers |
|---|---|---|---|---|
| phenyl-N=N-CH(OH)=CH-CHO | 1-hydroxy-2-aminobenzene | copper / chromium | orange / red-brown | orange. / red-brown. |
| phenyl-N=N-CH(OH)=CH-CHO | 1-hydroxy-2-aminobenzene-4-sulfonic acid amide | copper / chromium | orange / red-brown | orange. / red-brown. |
| Cl-phenyl-N=N-CH(OH)=CH-CHO | 1-hydroxy-2-aminobenzene-4-sulfonic acid anilide | copper / chromium | orange / red-brown | orange. / red-brown. |
| Cl-phenyl-N=N-CH(OH)=CH-CHO | 1-hydroxy-2-aminobenzene-4-carboxylic acid amide | copper / chromium | orange / red-brown | orange. / red-brown. |
| Cl-phenyl-N=N-CH(OH)=CH-CHO | 1-hydroxy-2-amino-4-nitrobenzene | copper / chromium | reddish orange / brown-red | reddish orange. / brown-red. |
| $O_2N$-phenyl-N=N-CH(OH)=CH-CHO | 1-hydroxy-2-aminobenzene-4-sulfonic acid | copper / chromium / cobalt | brown / Bordeaux / Bordeaux | brown. / Bordeaux. / Bordeaux. |
| $O_2N$-phenyl-N=N-CH(OH)=CH-CHO | 1-hydroxy-2-amino-5-nitrobenzene | copper / chromium / zinc | Bordeaux | blue. |
| $H_2NO_2S$-phenyl-N=N-CH(OH)=CH-CHO | 1-hydroxy-2-aminobenzene-4-sulfonic acid dimethylamide | copper / chromium / zinc | orange / red-brown / orange | orange. / red-brown. / orange. |
| $H_2NO_2S$-phenyl-N=N-CH(OH)=CH-CHO | 1-hydroxy-2-amino-4-chlorobenzene | copper / chromium | orange / red-brown | orange. / red-brown. |
| $H_2NO_2S$-phenyl-N=N-CH(OH)=CH-CHO | 1-hydroxy-2-amino-5-nitrobenzene | copper / chromium | red-brown / brown-violet | red-brown. / brown-violet. |
| $H_3C$-CO-HN-phenyl-N=N-CH(OH)=CH-CHO | 1-hydroxy-2-aminobenzene-4-sulfonic acid methylamide | copper / chromium | reddish orange / red-brown | reddish orange. / red-brown. |
| $H_3C$-CO-HN-phenyl-N=N-CH(OH)=CH-CHO | 1-hydroxy-2-amino-4-nitrobenzene | copper / chromium | brown-red / brown | brown-red. / brown. |
| naphthyl-N=N-CH(OH)=CH-CHO | 1-hydroxy-2-aminobenzene-4-sulfonic acid amide | copper / chromium | brown-red / brown | brown-red. / brown. |
| naphthyl-N=N-CH(OH)=CH-CHO | 1-hydroxy-2-amino-4-chlorobenzene | copper / chromium | red-brown / red-brown | red-brown. / red-brown. |
| Cl, $H_3C_2O_3S$-naphthyl-N=N-CH(OH)=CH-CHO | 1-hydroxy-2-aminobenzene-4-sulfonic acid | copper | brown-red | brown-red. |

| arylazomalonodialdehyde component (1 mol) | aromatic orthohydroxyl component (2 mols) | metal | Shade of color on— wool | Shade of color on— polyamide fibers |
|---|---|---|---|---|
| 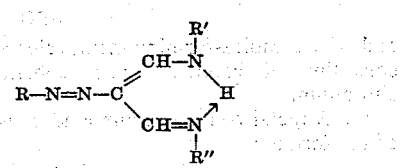 | 1-hydroxy-2-aminobenzene-4-sulfonic acid anilide. | copper<br>chromium<br>zinc | reddish orange<br>red-brown<br>reddish orange | reddish orange.<br>red-brown.<br>reddish orange. |
| (structure: phenyl-N=N-phenyl-N=N-CH=C(OH)-CHO) | 1-hydroxy-2-aminobenzene-4-sulfonic acid amide. | copper<br>chromium | red-brown<br>violet | red-brown.<br>violet. |
| (structure: phenyl-N=N-phenyl-N=N-CH=C(OH)-CHO) | 1-hydroxy-2-amino-5-nitro-benzene. | copper<br>chromium<br>zinc | violet<br>violet<br>Bordeaux | violet.<br>violet.<br>Bordeaux. |
| (structure with H₂NO₂S, OCH₃, H₃CO groups) | 1-hydroxy-2-aminobenzene-4-sulfonic acid anilide. | copper<br>chromium | red-brown<br>violet | red-brown.<br>violet. |
| (structure with H₂NO₂S, OCH₃, H₃CO groups) | 1-hydroxy-2-amino-5-nitro-benzene. | copper<br>chromium | brown<br>violet | brown.<br>violet. |

We claim:

1. A process for the production of metal complex dyestuffs which comprises condensing a member selected from the group consisting of a benzeneazo-malonodialdehyde, benzeneazo-benzeneazo-malonodialdehyde and a naphthaleneazo-malonodialdehyde with a primary aromatic amino compound selected from the group consisting of a primary aniline and a primary naphthyl amine, said amino compound containing a member selected from the group consisting of a hydroxy and a thiol group in ortho-position to the nitrogen atom, and reacting the di-anil thus formed with a metal-supplying compound of a complex-forming metal selected from the group consisting of copper, nickel, cobalt, iron, zinc and chromium.

2. A metal complex compound consisting of a di-anil of the formula $$R-N=N-C\begin{matrix}CH=N-R'\\ \phantom{-}\\ CH=N-R''\end{matrix}$$

wherein R represents an aromatic radical selected from the group consisting of a benzene, a benzene-azo-benzene and a naphthalene radical and R' and R'' are aromatic radicals selected from the group consisting of benzene and naphthalene radicals which contain a member selected from the group consisting of a hydroxy and a thiol group in ortho-position to the nitrogen atom, and of a complex-forming metal selected from the group consisting of copper, nickel, cobalt, iron, zinc and chromium.

3. A metal complex compound consisting of a di-anil of the formula

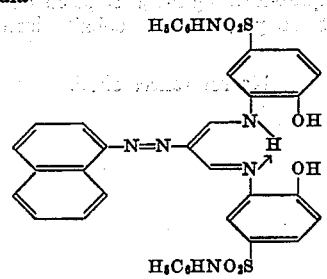

and of a complex-forming metal selected from the group consisting of copper, nickel, cobalt, iron, zinc and chromium.

4. A metal complex compound consisting of a di-anil of the formula

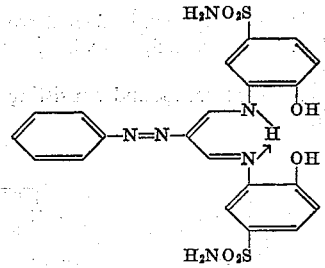

and of a complex-forming metal selected from the group consisting of copper, nickel, cobalt, iron, zinc and chromium.

5. A metal complex compound consisting of a di-anil of the formula

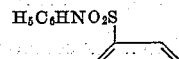
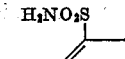

and of a complex-forming metal selected from the group consisting of copper, nickel, cobalt, iron, zinc and chromium.

6. A metal complex compound consisting of a di-anil of the formula

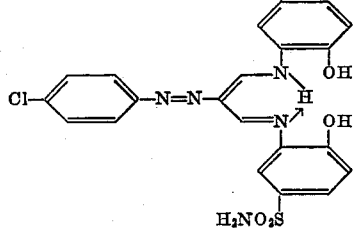

and of a complex-forming metal selected from the group consisting of copper, nickel, cobalt, iron, zinc and chromium.

7. A metal complex compound consisting of a di-anil of the formula

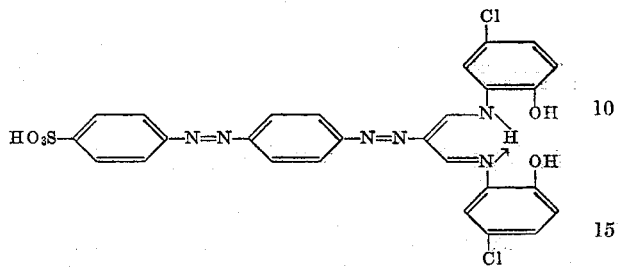

and of a complex-forming metal selected from the group consisting of copper, nickel, cobalt, iron, zinc and chromium.

8. A metal complex compound consisting of a di-anil of the formula

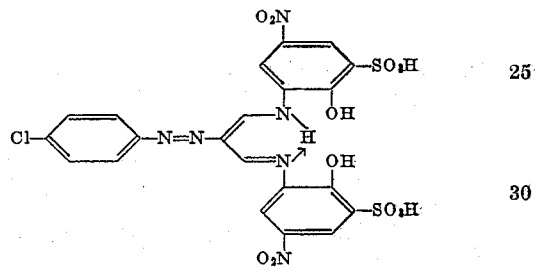

and of a complex-forming metal selected from the group consisting of copper, nickel, cobalt, iron, zinc and chromium.

9. A metal complex compound consisting of a di-anil of the formula

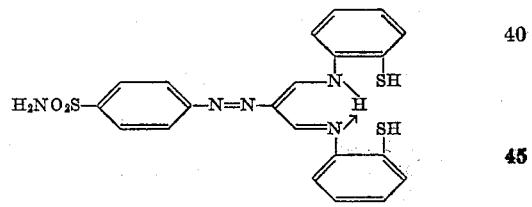

and of a complex-forming metal selected from the group consisting of copper, nickel, cobalt, iron, zinc and chromium.

10. A metal complex compound consisting of a di-anil of the formula

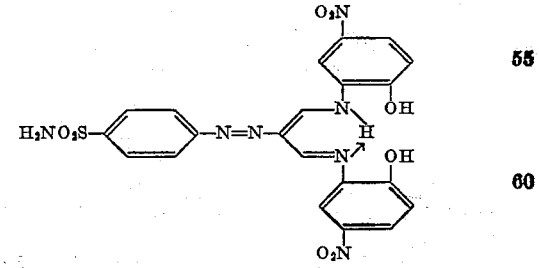

and of a complex-forming metal selected from the group consisting of copper, nickel, cobalt, iron, zinc and chromium.

11. A metal complex compound consisting of a di-anil of the formula

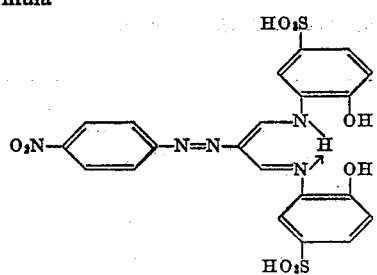

and of a complex-forming metal selected from the group consisting of copper, nickel, cobalt, iron, zinc and chromium.

12. A metal complex compound consisting of a di-anil of the formula

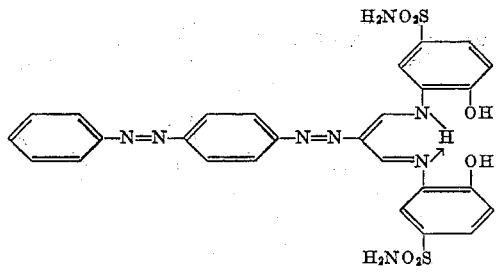

and of a complex-forming metal selected from the group consisting of copper, nickel, cobalt, iron, zinc and chromium.

13. A metal complex compound consisting of a di-anil of the formula

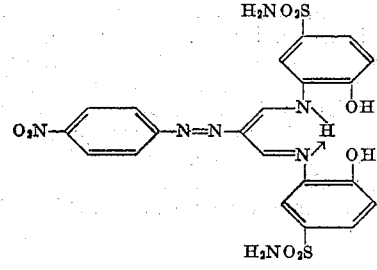

and of a complex-forming metal selected from the group consisting of copper, nickel, cobalt, iron, zinc and chromium.

14. A metal complex compound consisting of a di-anil of the formula

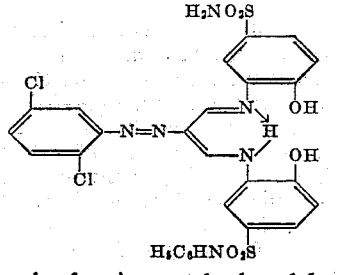

and of a complex-forming metal selected from the group consisting of copper, nickel, cobalt, iron, zinc and chromium.

No references cited.